UNITED STATES PATENT OFFICE.

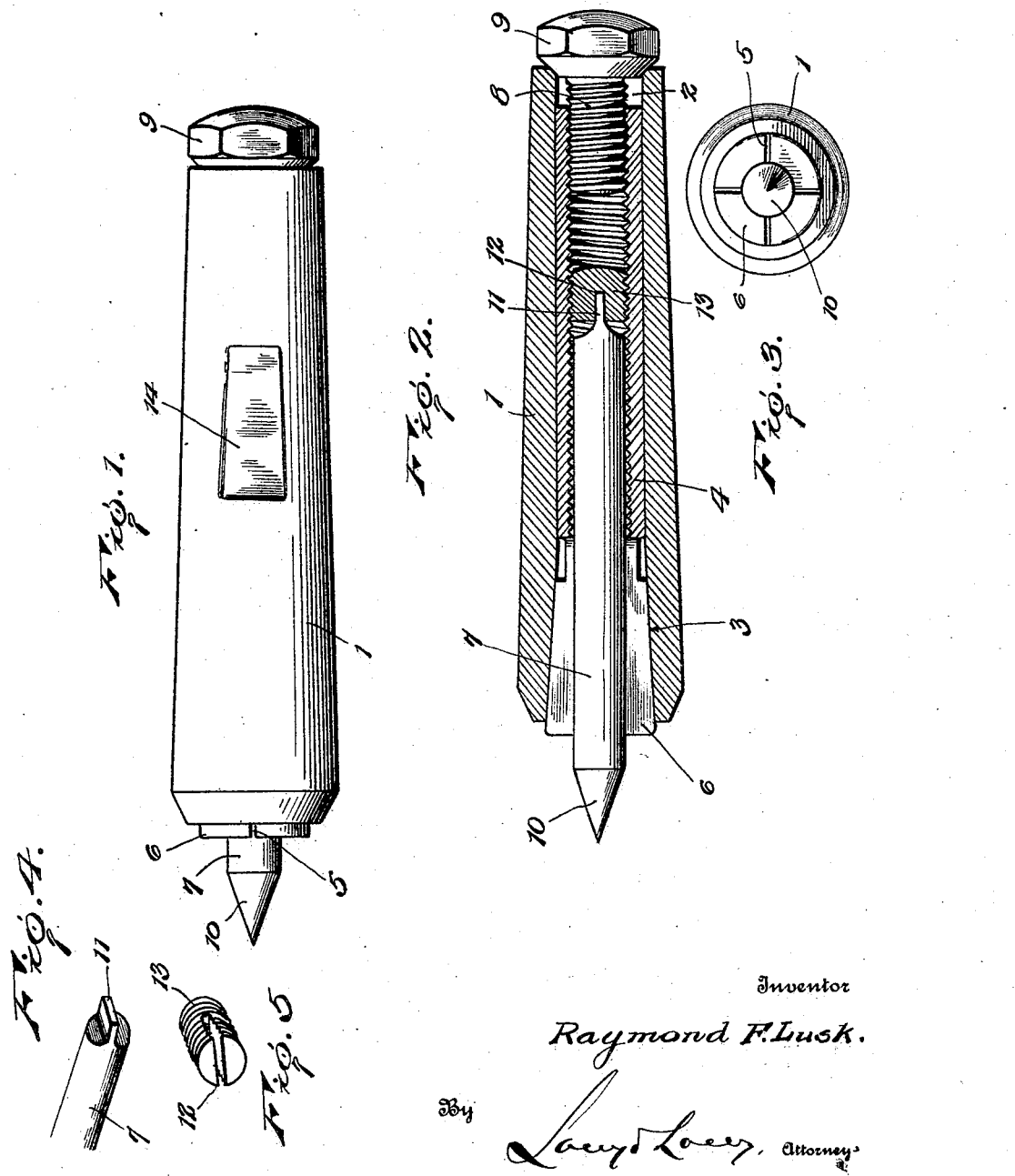

RAYMOND F. LUSK, OF COLUMBUS GROVE, OHIO, ASSIGNOR OF ONE-HALF TO CHARLES A. GETTMAN, OF COLUMBUS GROVE, OHIO.

LATHE CENTER.

1,416,102.  Specification of Letters Patent.  Patented May 16, 1922.

Application filed October 14, 1920. Serial No. 416,829.

*To all whom it may concern:*

Be it known that I, RAYMOND F. LUSK, a citizen of the United States, residing at Columbus Grove, in the county of Putnam and State of Ohio, have invented certain new and useful Improvements in Lathe Centers, of which the following is a specification.

The object of this invention is to provide a lathe center which is simple in construction, may be readily adjusted to meet requirements and will be efficient in use. The invention is illustrated in the accompanying drawings, in which—

Figure 1 is an elevation of a lathe center embodying my improvements;

Fig. 2 is a longitudinal section of the same;

Fig. 3 is an end view thereof;

Fig. 4 is a detail perspective view of the inner end of the center point;

Fig. 5 is a detail perspective view of the adjusting screw.

In carrying out my invention, I employ an outer casing or shank 1 which is tapered externally and is provided internally with a central bore having straight parallel walls throughout the greater portion of its length, as shown at 2, and flared toward the larger end of the shank or casing, as indicated at 3. A gripping sleeve 4 is fitted within the shank or casing and has an internally threaded cylindrical body through the greater portion of its length adapted to fit snugly but slidably within the straight wall portion of the bore 2. Beyond the internally threaded cylindrical portion of the sleeve, the same is formed into an externally flared head which is split radially, as shown at 5, thereby providing gripping jaws 6 which are adapted to bend around the center point 7 and secure the same within the shank or casing when the sleeve is properly adjusted. A draw screw or adjusting bolt 8 is inserted through the smaller end of the casing or shank so as to engage the internally threaded bore of the gripping sleeve and this draw screw or bolt is provided with a head 9 of sufficient diameter to bear against the end of the casing or shank, as clearly shown in Figs. 1 and 2. The center point 7 has one end, 10, tapered or of conical form so as to provide a centering point adapted to engage the work and this centering point is constructed of high speed steel or similar material so that it will effectually resist wear and bending strain. The inner end of the point is reduced and formed into a diametrically arranged lip or bit 11 which is adapted to engage a corresponding slot or notch 12 in the opposed end of an adjusting nut or stop 13, the said nut or stop being engaged in the threaded bore of the gripping sleeve, as clearly shown in Fig. 2.

In assembling the parts, the stop or nut 13 is engaged in the threaded bore of the gripping sleeve and the lip or bit 11 of the point is then engaged in the notch or slot 12 of said nut or stop so that by rotating the point the nut will be caused to travel along the sleeve and will determine the extent to which the conical end of the point will project beyond the jaws 6 of the gripping sleeve. After the point and stop have been thus assembled with the gripping sleeve, the sleeve is inserted through the larger flared end of the shank or outer casing, after which the adjusting or draw screw or bolt 8 is engaged in the threaded inner end of the sleeve, as clearly shown in Fig. 2, and turned so that through its threaded engagement with the sleeve it will draw the sleeve longitudinally into the casing and cause the jaws 6 to ride inwardly upon the flared wall 3 of the casing whereby the jaws will be caused to bind firmly upon and around the point and hold the same securely. The device may then be fitted in the lathe in the usual manner and to facilitate such fitting the casing may be provided externally with one or more flat surfaces 14 to be engaged by a wrench or similar tool.

It will be readily seen that the adjustable nut or stop 13 forms an effectual abutment for the point so that longitudinal movement of the same when it is in use will be effectually resisted and the strain upon the gripping jaws 6 will be reduced. The point itself constitutes the means for setting the stop and the stop is obviously housed in and entirely surrounded by the gripping sleeve and the casing so that after it is once set in the desired position it will not be disturbed and need readjustment. At the same time the point may be readily removed when it is necessary to repair, regrind, or renew the same inasmuch as to effect such withdrawal it is necessary merely to reversely rotate the adjusting or draw screw 8, whereupon the gripping sleeve may be easily pushed out of the outer casing and the piont and stop or abutment will, of course, be projected from the casing with the sleeve. The device is obviously simple in its construction and the arrangement of its parts and may be very quickly assembled or disassembled.

Having thus described the invention, what is claimed as new is:

1. The combination of an outer casing, a gripping sleeve disposed axially in said casing and internally threaded at its inner end, a point held by and within said sleeve, and an adjusting screw inserted through the end of the casing to engage the inner end of the sleeve and secure the same.

2. The combination of an outer casing having a center bore flared at one end, a gripping sleeve fitted in said bore and provided at one end with inwardly tapered gripping jaws adapted to fit within the flared end of the casing, said sleeve being internally threaded at its inner end, an adjusting screw inserted through the inner end of the casing to engage the internally threaded inner end of the sleeve and provided with an enlarged head bearing against the inner end of the casing, and a point fitted within the gripping sleeve and held by and between the jaws of the same.

3. The combination of an outer casing having a smooth bore, said bore being outwardly flared at one end, a gripping sleeve fitted within said bore and provided with inwardly tapered jaws at one end adapted to fit within the flared end of the casing, said sleeve being internally threaded in its inner portion, an adjusting screw inserted through the inner end of the casing to engage the internally threaded end of the gripping sleeve and provided with an enlarged head bearing against the inner end of the casing, a nut fitted in the threaded bore of the gripping sleeve and provided with a diametric slot in its outer end, and a center point disposed in the bore of the sleeve to be held by the jaws of the same and provided at its inner end with a bit engaging the diametric slot in the said nut.

In testimony whereof I affix my signature.

RAYMOND F. LUSK. [L. S.]